US007239032B1

(12) United States Patent
Wilson et al.

(10) Patent No.: US 7,239,032 B1

(45) Date of Patent: Jul. 3, 2007

(54) STARTER-GENERATOR

(75) Inventors: Pearl A. Wilson, Roseau, MN (US); David J. Thompson, Middle River, MN (US)

(73) Assignee: Polaris Industries Inc., Medina, MN (US)

( * ) Notice: Subject to any disclaimer, the term of this patent is extended or adjusted under 35 U.S.C. 154(b) by 67 days.

(21) Appl. No.: 11/283,016

(22) Filed: Nov. 18, 2005

(51) Int. Cl.
*H02P 9/04* (2006.01)
*H02K 7/20* (2006.01)

(52) U.S. Cl. .................... 290/36 R; 290/31; 290/38 R; 310/89

(58) Field of Classification Search .................. 290/27, 290/30 R, 31, 32, 36 R, 38 R; 310/74, 45, 310/89
See application file for complete search history.

(56) References Cited

U.S. PATENT DOCUMENTS 4,346,773 A * 8/1982 Hofbauer et al. ........... 180/165
4,458,156 A 7/1984 Maucher et al.
4,626,696 A 12/1986 Maucher et al.
4,695,261 A 9/1987 Broughton et al.
5,966,985 A 10/1999 Shuto et al.
6,098,584 A 8/2000 Ahner et al.
6,133,659 A * 10/2000 Rao ............................ 310/89
6,323,573 B1 * 11/2001 Pinkerton ................... 310/178
6,371,877 B1 4/2002 Schroeder et al.
6,388,348 B2 * 5/2002 van Heyden et al. ......... 310/74
6,392,311 B2 5/2002 Inaba et al.
6,424,065 B1 7/2002 Vlemmings et al.
6,428,442 B1 8/2002 Turgay et al.
6,484,596 B2 11/2002 Puchas
6,616,573 B2 9/2003 McLeod et al.
6,710,579 B2 3/2004 Ebel et al.
6,787,931 B2 9/2004 Nakagawa et al.
6,787,959 B2 9/2004 Weimer
6,814,204 B2 11/2004 Diemer et al.
6,821,223 B2 11/2004 Henry
6,825,573 B2 * 11/2004 Suzuki et al. ............... 290/1 A
2001/0006292 A1 7/2001 Inaba et al.
2002/0039927 A1 4/2002 Welke
2002/0125861 A1 9/2002 Ebel et al.
2003/0197384 A1 10/2003 Vuk
2004/0134695 A1 7/2004 Blome et al.
2004/0224817 A1 11/2004 Graf et al.

* cited by examiner

*Primary Examiner*—Nicholas Ponomarenko

(57) ABSTRACT

A vehicle includes a starter-generator assembly; portions of the assembly may be disposed within a stator cover, which is mounted to a crank case of an engine of the vehicle. According to some embodiments, one of at least two operator activated input mechanisms may be selected for starting the starter-generator. According to some methods of operation, the starter-generator assembly can be used to pre-set pistons of the engine.

21 Claims, 4 Drawing Sheets

STARTER-GENERATOR

TECHNICAL FIELD

The present invention pertains to vehicles including starter-generators and particularly to starter-generator assemblies.

BACKGROUND

Starter-generators are electromagnetic machines that combine the functions of a starter motor and a generator in a single device. A starter-generator is responsible for starting an engine and, once the engine is running, operating as a generator of electrical power. One of the obvious advantages of a starter-generator is the elimination of a starter motor. Many vehicles, for example all-terrain vehicles (ATV's) and snowmobiles, need to incorporate relatively large starter motors to ensure engine starting reliability in colder climates; and these larger motors can take up too much space for compact vehicle designs, may be noisier than desired, and may add considerable weight and cost to the vehicle.

In recent years starter generators have been developed to produce relatively high torque for starting higher output engines, and one such type of starter generator is described in U.S. Pat. No. 6,392,311 which is incorporated by reference, in its entirety, herein. Because of the aforementioned advantage realized by incorporating starter-generators, there is a need for a sound structural and operational organization of starter-generators and associated components that will facilitate integration of starter-generator assemblies into vehicles such as ATV's and snowmobiles.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention.

Figure 1:
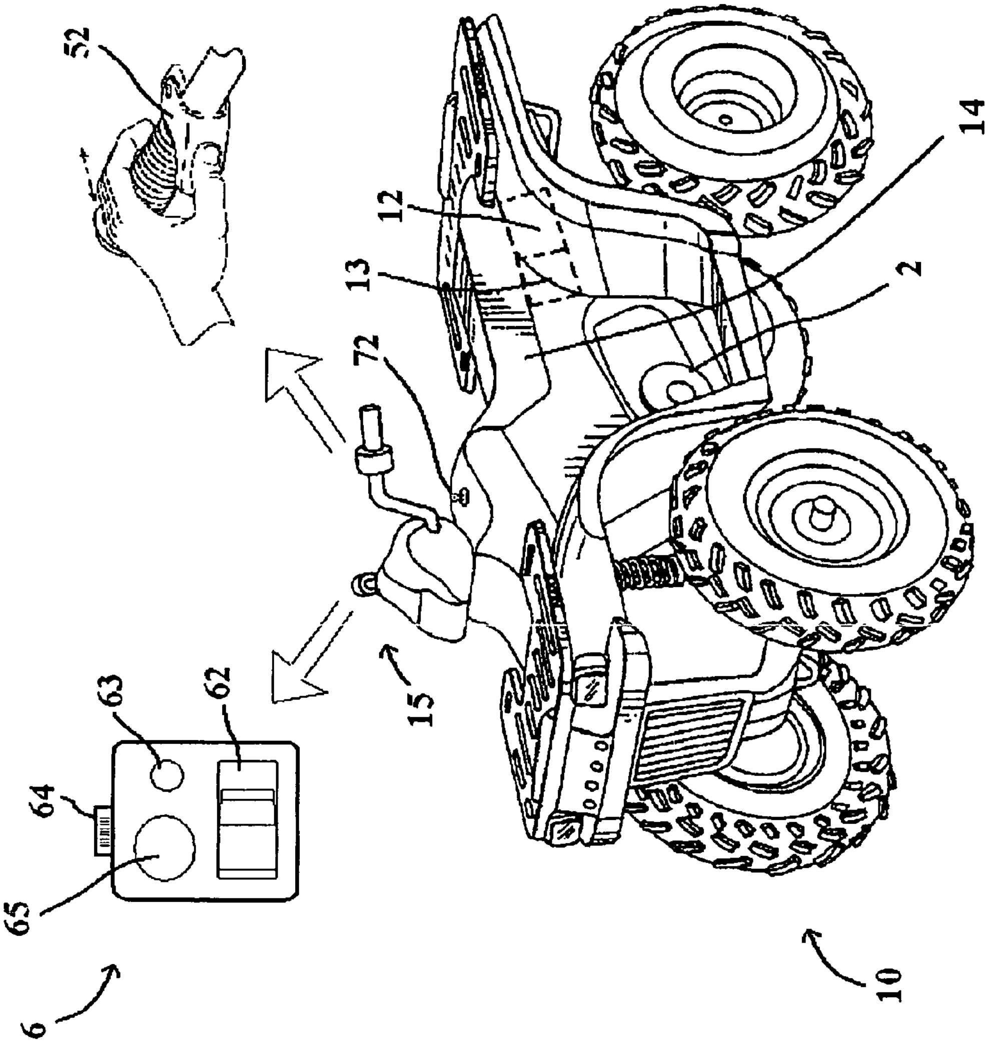
FIG. 1 is a perspective view including enlarged detailed schematics of an exemplary ATV, according to one embodiment of the present invention.

FIG. 1 is a perspective view including enlarged detailed schematics of an exemplary ATV 10 according to one embodiment of the present invention. FIG. 1 illustrates ATV 10 including a straddle seat 14 and a handlebar steering assembly 15; a keyed ignition 72 is disposed between seat 14 and steering assembly 15, and a throttle actuator 52 and an operator control box 6 are mounted on steering assembly 15, one on each handlebar, as shown in the detailed schematics indicated by the arrows. FIG. 1 further illustrates an engine 2, which may be mounted either in-line or transversely within a chassis of ATV 10, an electronic control unit (ECU) 12 and a battery 13; ECU 12 and battery 13, connected to one another, are shown mounted in close proximity to one another beneath seat 14, however, according to other embodiments of the present invention, ECU 12 and battery 13 are separated further apart from one another.

Figure 2:
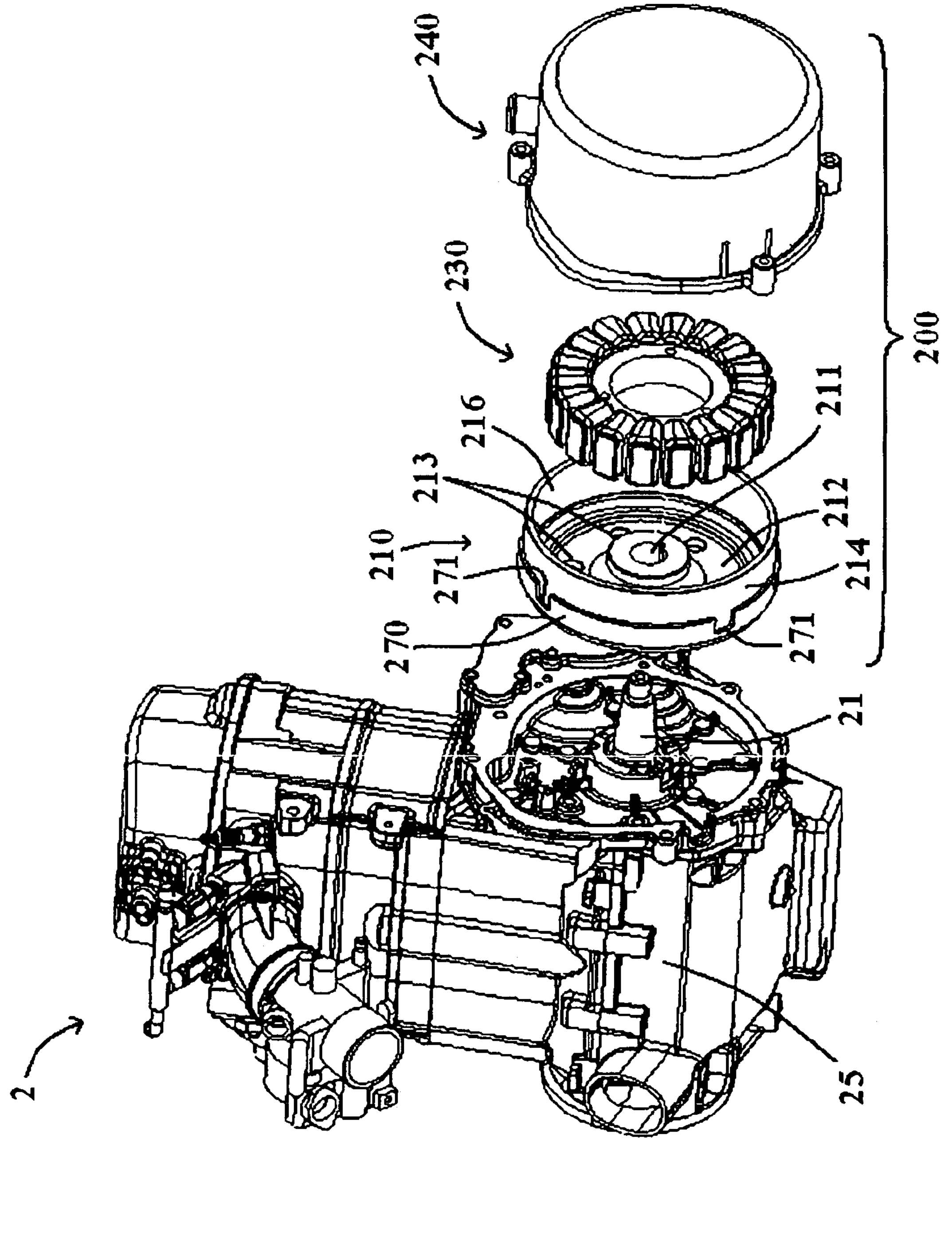
FIG. 2 is an exploded perspective view of a starter-generator assembly, according to some embodiments of the present invention.

According to embodiments of the present invention, vehicle 10 includes a starter-generator, for example, according to a starter-generator assembly 200 shown in FIG. 2, and ECU 12 includes a starter-generator controller connected to the starter-generator. According to the embodiment illustrated in FIG. 1, operator control box 6 includes a starter-generator selection switch 62, along with a display switch 63, a headlight switch 64 and a kill switch 65; starter-generator selection switch 62 allows an operator of ATV 10 to select either keyed-ignition 72 or throttle actuator 52 as a mechanism for activating and deactivating the starter-generator to start and stop engine 2. The starter-generator controller within ECU 12 receives a selected signal, from either throttle actuator 52 or keyed-ignition 72, as dictated by selection switch 62, to direct battery 13 to energize the starter-generator, for starting, or to cut off energy to stop the starter-generator. It should be noted that the present invention does not limit the location of selection switch 62 to that illustrated in FIG. 1; an alternate location of selection switch 62 may be hidden, for example beneath seat 14. Furthermore, alternate embodiments do not include a selection switch, having only one method for activating and deactivating the starter-generator.

FIG. 2 is an exploded perspective view of starter-generator assembly 200 to be mounted on engine 2, according to some embodiments of the present invention. FIG. 2 illustrates starter-generator assembly 200 including a magneto flywheel 210, a stator 230 and a stator cover 240. According to the illustrated embodiment, flywheel 210 includes a central bore 211 for direct coupling with a crank shaft 21 of engine 2; flywheel 210 further includes a disk 212 surrounding central bore 211 and an annular wall 214, having a magnetized inner surface 216, extending from a periphery of disk 212 in a cup-like fashion to surround stator 230. Stator cover 240, mounted to a crank case 25 of engine 2, serves to protect starter-generator assembly 200 from environmental elements, for example mud and water in the case of ATV's.

Figure 3:
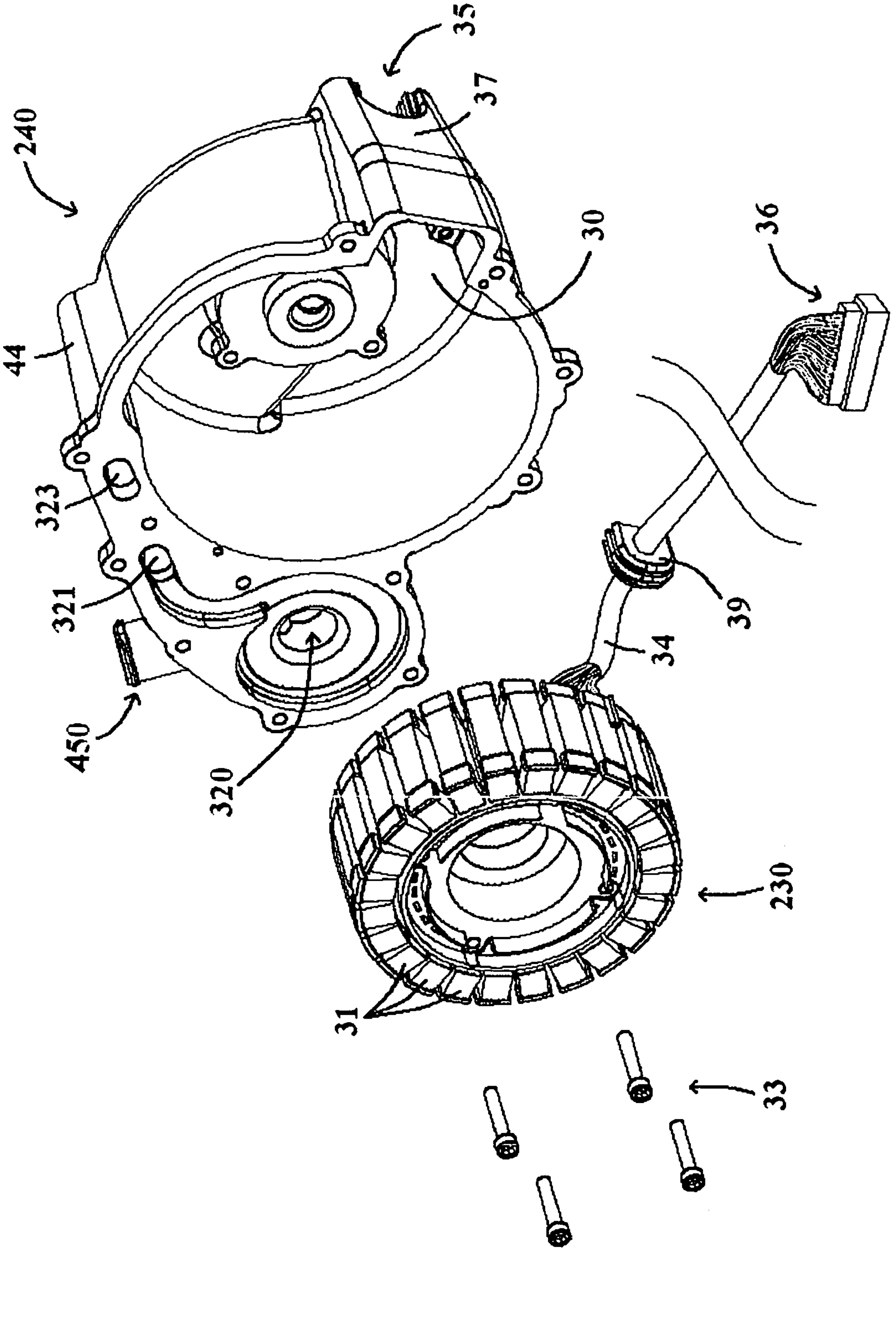
FIG. 3 is an exploded perspective view of a portion of the assembly shown in FIG. 2.

FIG. 3 is an exploded perspective view of a portion of the assembly shown in FIG. 2. FIG. 3 illustrates an inner surface 30 of stator cover 240 configured for the mounting of stator 230 thereto; a set of bolts 33 is shown for secure coupling of stator 230 to stator cover 240. FIG. 3 further illustrates stator 230 including a plurality of pole portions, i.e. radially extending protrusions 31 equally spaced about a periphery of stator; those skilled in the art will appreciate that stator coils or windings are wound about salient pole portions and a bundle of wires 34 electrically couples the coils or windings to an ECU and battery via a connector 36. According to the illustrated embodiment, bundle of wires 34 are routed out from the inside of stator cover 240 through a passageway 35 formed through a sidewall 37 of cover 240; a sealing element 39, for example formed of silicone rubber, is shown surrounding wire bundle 34 and having a contour for mating with passageway 35 to prevent ingress of environmental elements.

Figure 4:
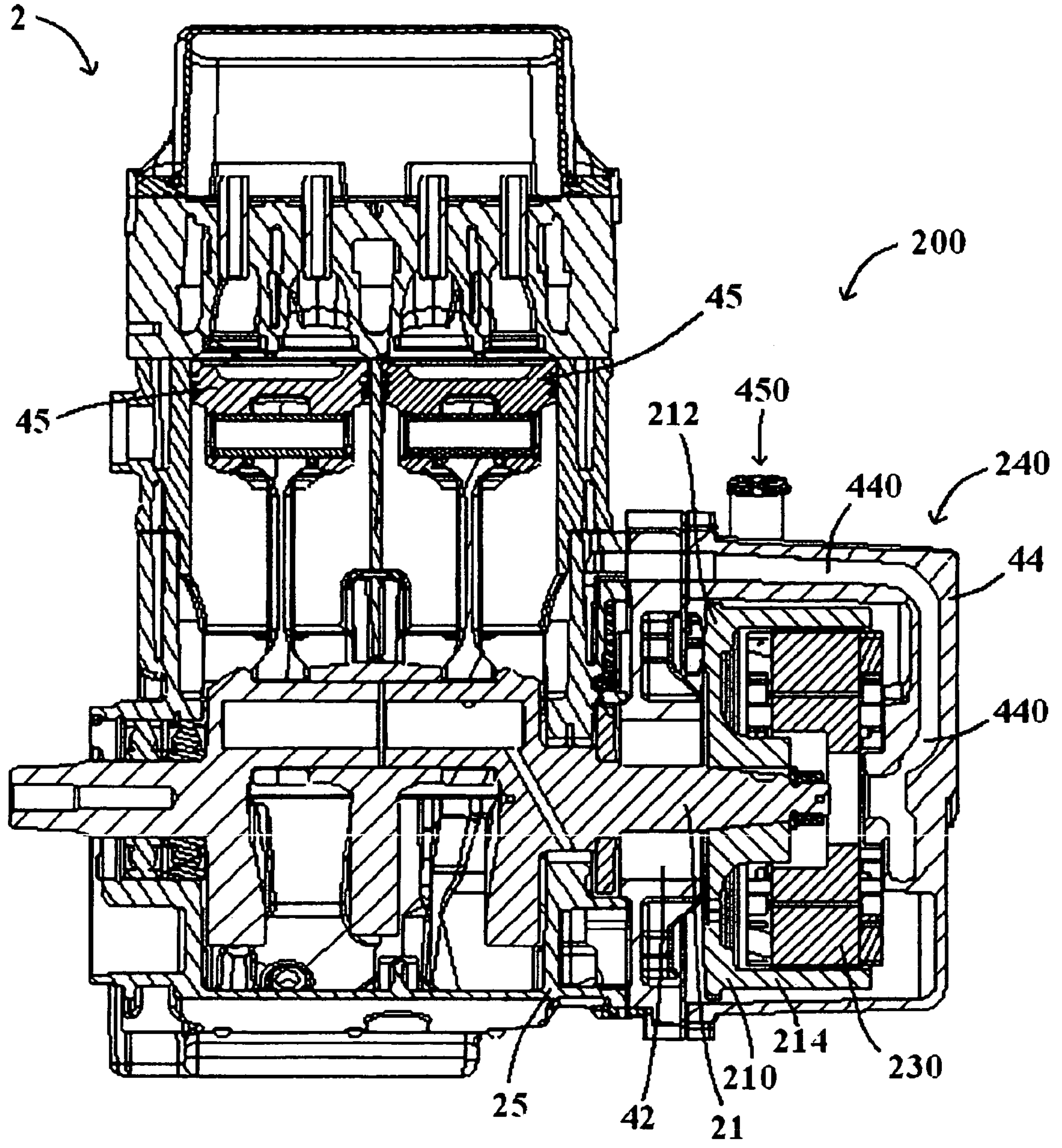
FIG. 4 is a section view of the engine and starter-generator assembly shown in FIG. 2.

FIG. 4 is a section view of engine 2 and starter-generator assembly 200. FIG. 4 illustrates flywheel 210 mounted on crank shaft 21, which extends from crank case 25 and is supported by bearing 42; flywheel 210 is oriented such that disk 212 of flywheel 210, positioned between stator 230 and crank case 25, is in close proximity to crank bearing 42, thus reducing a bending moment on crank shaft 21 and minimizing a load on crank bearing 42. If stator 230 were mounted directly to crankcase 25 of engine 2, being disposed between crank case 25 and flywheel 210, a size of crank bearing 42 would need to be increased to support an increased bending moment caused by flywheel 210 being mounted further away from crank case 25, toward the end of crank shaft 21.

According to some embodiments of the present invention, engine 2, being a relatively high output engine, requires a relatively large diameter flywheel, for example having a diameter greater than approximately 6 inches, and preferably between approximately 7 and 9 inches, to generate enough torque to start engine 2. Because of the relatively large diameter required, a weight of flywheel may become excessive, for example exceeding approximately 6–8 pounds; so, according to the illustrated embodiment, with reference to FIG. 2, holes or voids 213 are formed in disk 212 of flywheel 210 to reduce a weight thereof.

FIG. 4 further illustrates stator 230 surrounded by magnetized inner surface 216 of annular wall 214 of flywheel 210; according to some embodiments of the present invention, windings or coils of stator 230 and poles, N and S, of magnetized inner surface 216 may be configured in accordance with embodiments described in U.S. Pat. No. 6,392,311, which is incorporated by reference herein. According to the illustrated embodiment, stator 230, mounted to cover 240, is coaxially disposed within annular wall 214 of flywheel 210 such that magnetized inner surface 216 (FIG. 2) is rotatably disposed adjacent the stator coils. When the ATV operator activates the starter-generator to start engine 2, battery 13 (FIG. 1) energizes stator 230 via wire bundle 34 (FIG. 3); stator 230, via current passing through the coils thereof, causes magneto flywheel 210 to spin and thus bring crankshaft 21 up to an operable speed so that the engine combustion process can start. Once engine 2 is running, the starter-generator is utilized as a generator, wherein magneto flywheel 210 induces current flow in the windings of stator 230, which current flow may be supplied to charge the battery and power vehicle components.

Referring back to FIG. 2, it can be seen that starter-generator assembly 200 further includes a code or a trigger plate 270 mounted about an outer surface of annular wall 214 of magneto flywheel 210; trigger plate 270 includes a plurality of slits 271 positioned over a particular magnetic pole, for example N, of inner surface 216 so that a proximity sensor (i.e. a hall-effect sensor) may be used to indirectly detect the polarity of magnetic poles. According to some embodiments of the present invention, a magnetic sensor, housed within stator cover 240, creates a flux field so that when trigger plate 270 passes through the flux field, a signal indicative of piston and valve train positions is created. Such a signal can be used to facilitate positioning or pre-setting of pistons 45 (FIG. 4), when engine 2 is turned off, for a subsequent start, or upon initial vehicle power up prior to operator starting activation. For example, FIG. 4 illustrates pistons 45 pre-set at an uppermost point of their stroke; pistons 45 positioned as such, to start on a down stroke, will not have to immediately undergo a compression stroke and can build a bit of momentum for the upstroke, thus reducing any delay between operator activation, for example either via keyed ignition 72 or via throttle actuator 52 (FIG. 1), and actual starting of engine 2.

According to one embodiment, pistons 45 are pre-set directly prior to starting of the vehicle when an ECU, i.e. ECU 12 (FIG. 1), is first powered up; the ECU receives the signal indicative of crank shaft position from the magnetic sensor and then directs the battery, i.e. battery 13 (FIG. 1), to energize stator 230 according to the crank shaft position so that crankshaft 21 is caused to rotate until pistons 45 are positioned at top dead center, as illustrated in FIG. 4. Once pistons 45 are pre-set, the vehicle starting process is enabled. According to an alternate embodiment, pistons 45 are pre-set directly prior to vehicle shutdown; when the ECU receives a signal that the vehicle is being powered down, such as a kill switch being activated, the ECU, via stator 230, and according to the signal from the magnetic sensor, will cause crankshaft 21 to rotate until pistons 45 are positioned at top dead center, as indicated by the signal from the magnetic sensor. After pistons 45 are pre-set, the ECU will power down the vehicle under typical operation; at the next power start up of the vehicle, pistons 45 will be pre-set.

According to some embodiments of the present invention, up to approximately 900 watts of heat may be generated by the starter-generator during operation. Mounting stator 230 directly to stator cover 240, as illustrated in FIGS. 3 and 4, may allow for better heat dissipation from stator 230 via conductive heat transfer through cover 240. FIG. 4 further illustrates stator cover 240 including a channel 440 extending within a sidewall 44 of cover 240 and a port 450 through which a coolant enters channel 440; according to the illustrated embodiment, channel 440 provides for the passage of the coolant to remove the heat produced by the starter-generator during operation. Furthermore, with reference to FIGS. 3 and 4, it can be appreciated that channel 440 is routed in such away through a portion of sidewall 44 corresponding with inner surface 30, to which stator 230 is mounted, so as to maximize a heat transfer surface area, between stator 230 and channel 440, and to minimize a wall thickness between stator 230 and channel 440.

In FIG. 3, it can be seen that stator cover 240 further houses a coolant pump 320 that moves the coolant from port 450 into channel 440 at channel entry 321; after passing through channel 440, to cool stator 230, coolant exits cover sidewall 44, at exit port 323, to pass through engine cooling passageways and a heat exchanger (not shown) and then to re-enter at port 450. ATV coolant systems are known to those skilled in the art and typically include a closed-loop cooling circuit in which a coolant pump circulates fluid through passageways of the engine, where the fluid is heated, and then to an external heat exchanger (i.e. a radiator) where the heat is dissipated. Although FIG. 3 illustrates coolant pump 320 integral with stator cover 240, pump 320 may be disposed anywhere within the closed-loop cooling circuit, for example, internal or directly mounted to engine 2.

In the foregoing detailed description, the invention has been described with reference to specific embodiments. However, it may be appreciated that various modifications and changes can be made without departing from the scope of the invention as set forth in the appended claims. Although embodiments of the present invention have been described in the context of an ATV, it should be noted that other types of vehicles, for example snowmobiles, three-wheelers, go-carts, dune buggies, utility vehicles, personal watercraft, boats, scooters and motorcycles, including the features described herein are not outside the scope of the present invention.

We claim:

1. An ATV comprising:

a starter-generator assembly comprising:

a stator cover mounted to a crank case of the engine;

a stator including a plurality of coils, the stator disposed within the cover; and a magneto flywheel disposed within the cover in proximity to the crank case and directly coupled to a crank shaft of the engine, the crank shaft extending out from the crank case;

the flywheel including a disk, positioned between the crank case and the stator, and an annular wall extending axially away from a perimeter of the disk, in a direction away from the crank case, the annular wall including a magnetized inner surface surrounding the stator.

2. The ATV of claim 1, wherein a diameter of the flywheel is greater than approximately 6 inches.

3. The ATV of claim 1, wherein a diameter of the flywheel is between approximately 7 inches and approximately 9 inches.

4. The ATV of claim 1, wherein the flywheel disk includes a plurality of voids extending therethrough for weight-reduction.

5. The ATV of claim 1, wherein a stator cover sidewall includes a channel for passage of coolant therethrough.

6. The ATV of claim 1, wherein the stator is mounted on an inside surface of the stator cover.

7. The ATV of claim 6, wherein a stator cover sidewall corresponding to the inside surface, to which the stator is mounted, includes a channel for passage of coolant therethrough.

8. The ATV of claim 1, wherein the starter-generator assembly further comprises:

a trigger plate mounted about an outer surface of the annular wall of the flywheel; and a magnetic sensor housed within the stator cover and disposed in proximity to the trigger plate, the magnetic sensor creating a flux field such that, when the trigger plate passes through the flux field, a signal indicative of a position of a piston of the engine is created.

9. The ATV of claim 1, wherein a sidewall of the stator cover includes a passageway extending therethrough, from the inner surface of the stator cover to an outer surface of the stator cover; the passageway for routing wires, from the coils of the stator, out from the stator cover.

10. The ATV of claim 9, wherein the starter-generator assembly further comprises a sealing element mating with a contour of the passageway, the sealing element preventing fluid ingress through the passageway when the wires are routed therethrough.

11. A starter-generator assembly for an engine of a vehicle, comprising:

a stator cover mounted to a crank case of the engine;

a stator including a plurality of coils, the stator disposed within the cover; and a magneto flywheel disposed within the cover in proximity to the crank case and directly coupled to a crank shaft of the engine, the crank shaft extending out from the crank case;

the flywheel including a disk, positioned between the crank case and the stator, and an annular wall extending axially away from a perimeter of the disk, in a direction away from the crank case, the annular wall including a magnetized inner surface surrounding the stator.

12. The assembly of claim 11, wherein a diameter of the flywheel is greater than approximately 6 inches.

13. The assembly of claim 11, wherein a diameter of the flywheel is between approximately 7 inches and approximately 9 inches.

14. The assembly of claim 11, wherein the flywheel disk includes a plurality of voids extending therethrough for weight-reduction.

15. The assembly of claim 11, wherein a sidewall of the stator cover includes a channel for passage of coolant therethrough.

16. The assembly of claim 11, wherein the stator is mounted on an inside surface of the stator cover.

17. The assembly of claim 16, wherein a stator cover sidewall corresponding to the inside surface, to which the stator is mounted, includes a channel for passage of coolant therethrough.

18. The assembly of claim 11, further comprising:

a trigger plate mounted about an outer surface of the annular wall of the flywheel; and a magnetic sensor housed within the stator cover and disposed in proximity to the trigger plate, the magnetic sensor creating a flux field such that, when the trigger plate passes through the flux field, a signal indicative of a position of a piston of the engine is created.

19. The assembly of claim 11, wherein a sidewall of the stator cover includes a passageway extending therethrough, from the inner surface of the stator cover to an outer surface of the stator cover; the passageway for routing wires, from the coils of the stator, out from the stator cover.

20. The assembly of claim 19, further comprising a sealing element mating with a contour of the passageway, the sealing element preventing fluid ingress through the passageway when the wires are routed therethrough.

21. The assembly of claim 11, wherein the vehicle is selected from the group consisting of all-terrain vehicles, three-wheelers, go-carts, dune buggies, utility vehicles, snowmobiles, personal watercraft, boats with outboard motors, boats with inboard motors, scooters, and motorcycles.

* * * * *